United States Patent
Lin

(10) Patent No.: US 10,188,235 B2
(45) Date of Patent: Jan. 29, 2019

(54) FILTER CUP

(71) Applicant: Tsai-Hui Lin, Kaohsiung (TW)

(72) Inventor: Tsai-Hui Lin, Kaohsiung (TW)

( * ) Notice: Subject to any disclaimer, the term of this patent is extended or adjusted under 35 U.S.C. 154(b) by 344 days.

(21) Appl. No.: 15/098,745

(22) Filed: Apr. 14, 2016

(65) Prior Publication Data

US 2017/0295985 A1    Oct. 19, 2017

(51) Int. Cl.
*A47J 31/06* (2006.01)
*A47G 19/22* (2006.01)

(52) U.S. Cl.
CPC .......... *A47J 31/0615* (2013.01); *A47G 19/22* (2013.01)

(58) Field of Classification Search
CPC .... A47J 31/02; A47J 31/0615; A47J 31/0605; A47J 31/061; A47J 31/06; A47J 31/0657; A47J 31/0663; A47J 31/0668; A47J 31/0689
USPC .................. 90/209, 317, 306, 323, 279, 295
See application file for complete search history.

(56) References Cited

U.S. PATENT DOCUMENTS

| | | | | |
|---|---|---|---|---|
| 5,632,193 A * | 5/1997 | Shen | ...... | A47J 31/02 99/285 |
| 5,632,194 A * | 5/1997 | Lin | ...... | A47J 31/02 99/285 |
| 5,813,317 A * | 9/1998 | Chang | ...... | A47J 31/02 210/238 |
| 5,826,493 A * | 10/1998 | Tien Lin | ...... | A47J 31/02 99/306 |
| 6,164,190 A * | 12/2000 | Tien Lin | ...... | A47J 31/061 99/299 |
| 6,327,965 B1 * | 12/2001 | Lin Tien | ...... | A47J 31/02 99/299 |
| 2009/0272276 A1 * | 11/2009 | Lin Tien | ...... | A47J 31/061 99/298 |
| 2010/0212509 A1 * | 8/2010 | Tien | ...... | A47J 31/0605 99/305 |
| 2012/0024162 A1 * | 2/2012 | Chen | ...... | A47J 31/005 99/316 |

FOREIGN PATENT DOCUMENTS

| TW | M385994 U1 | 8/2010 |
|---|---|---|
| TW | M462050 U1 | 9/2013 |
| TW | M465848 U | 11/2013 |

* cited by examiner

*Primary Examiner* — Dana Ross
*Assistant Examiner* — Kuangyue Chen
(74) *Attorney, Agent, or Firm* — Rosenberg, Klein & Lee

(57) ABSTRACT

A filter cup is revealed. The filter cup includes an outer cup, an inner cup mounted in the outer cup and a grip. The inner cup consists of a filter bottom surface on the bottom thereof, a plug-like member on the filter bottom surface, and at least two flanges on top of the inner cup. A discharge hole is disposed on bottom of the outer cup and sealed by the plug-like member. Two rotating members are pivotally connected to the outer cup and each includes a leaning portion projecting therefrom. The grip is connected to the rotating members. The rotating members are driven to move for pushing the flanges and moving the inner cup vertically by the leaning portions thereof when the grip is pulled. Thus a gap is formed between the plug-like member and the discharge hole, allowing liquid in the inner to flow out therethrough.

9 Claims, 6 Drawing Sheets

FILTER CUP

BACKGROUND OF THE INVENTION

Field of the Invention

The present invention relates to a filter cup, especially to a filter cup that includes an outer cap and an inner cup mounted in the outer cap. A gap is generated between the inner and the outer cups through the inner cup being pushed to move upward. Thus residue is left in the inner cup while infusion is passed through the gap and a discharge hole of the outer cup to be discharged.

Descriptions of Related Art

In order to prevent tea or fruit from being soaked in a teapot too long and the infusion may have astringent or sour taste, the infusion and the residue of tea or fruit should be separated after a period of time. Thus users can drink the infusion directly while the separated residue of tea or fruit can be soaked again.

Refer to Taiwanese Utility Model Pat. No. M385994 U, a filter cup is disclosed. The filter cup includes a cup body mounted in an outer housing. The cup body is disposed with a hole communicating with the outside and a plug disposed in a seesaw manner. Based on the lever principle, a driver is used to control the plug and further control the flow volume of tea infusion.

Refer to Taiwanese Utility Model Pat. No. M462050 U, a brew cup is revealed. An insertion hole is disposed on a bottom of an outer cup while a moveable plug is mounted in the insertion hole and a rod is extended from the moveable plug. An elastic element is set around the rod and is against between the moveable plug and the circumference of the insertion hole so as to keep the moveable plug moveably in the insertion hole. An inner cup with something going to be brewed is mounted in a receiving space of the outer cup. A plurality of channels is arranged at the bottom side of the inner cup. The inner cup can be pressed by an external force applied and then leaning against the moveable plug to make the moveable plug enter the insertion hole. After the external force applied disappearing, the moveable plug is released from the insertion hole due to elasticity of the elastic element. Thus liquid in the outer cup flows out from the insertion hole.

Refer to Taiwanese Utility Model Pat. No. M465848 U, a press tea pot is disclosed. When a V-shaped elastic clip is mounted into a stopping slot, a locking part of the V-shaped elastic clip is locked and positioned in the stopping slot. While the V-shaped elastic clip is stopped and limited by a stopping ring, the locking part is released from the stopping slot. Thereby a valve over a through hole is easily operated by pressing a press bar for control of the timing when tea infusion is discharged.

However, these prior arts all require the external force applied continuously to filter the tea infusion and make the tea infusion flow out. This causes inconvenience in use.

Thus there is room for improvement and a need to provide a cup with novel structure.

SUMMARY OF THE INVENTION

Therefore it is a primary object of the present invention to provide a filter cup that is easy and convenient in use by an inner cup mounted in an outer cup and pushed to move upward for allowing liquid therein flowing out smoothly.

In order to achieve the above object, a filter cup of the present invention includes an inner cup, an outer cup and a grip.

A bottom side of the inner cup is a conical surface that forms a filter bottom surface. A plug-like member is arranged at the filter bottom surface. At least two flanges are formed on two corresponding edges on top of the inner cup. The outer cup is used to mount the inner cup therein. A discharge hole is disposed on a bottom surface of the outer cup and is corresponding to the plug-like member of the inner cup. The discharge hole is plugged by and closely matched with the plug-like member to prevent liquid in the inner cup from leaking out. Two corresponding rotating members are pivotally connected to an upper part of the outer cup. A leaning portion is radially extended and projecting from a part of an edge at one end of each rotating member that is close to an inner wall of the outer cup. The positions of the two rotating members are corresponding to the positions of the two flanges of the inner cup respectively.

Two ends of the grip are connected to and positioned by the two rotating members respectively.

Thereby the rotating members are also driven to move so as to push the flanges of the inner cup and move the inner cup upward when the grip is pulled by a user. Thus a gap is generated between the plug-like member and the discharge hole. The liquid in the inner cup can pass through the gap and then flow out from the discharge hole.

The filter bottom surface is a filter screen.

A sealing gasket is arranged around the plug-like member for improving leakage prevention between the plug-like member and the discharge hole.

An inner cup cover is set over the inner cup.

An upper part of the outer cup is disposed with two insertion holes corresponding to each other and used for mounting the two rotating members respectively.

Each rotating member includes an axial hole while a projecting pin is arranged at each of two ends of the grip. The projecting pin is mounted into and fixed in the axial hole correspondingly so that the rotating members are driven to rotate by the grip being pulled.

A handle is connected to an outer wall of the outer cup.

Compared with the structure available now, the present invention has the advantage of convenience in use. The user only needs to pull the grip to a certain position and then the inner cup is moved upward. Thus the liquid in the inner cup passes through the gap between the plug-like member and the discharge hole to flow out. The user doesn't need to apply force to the grip continuously.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
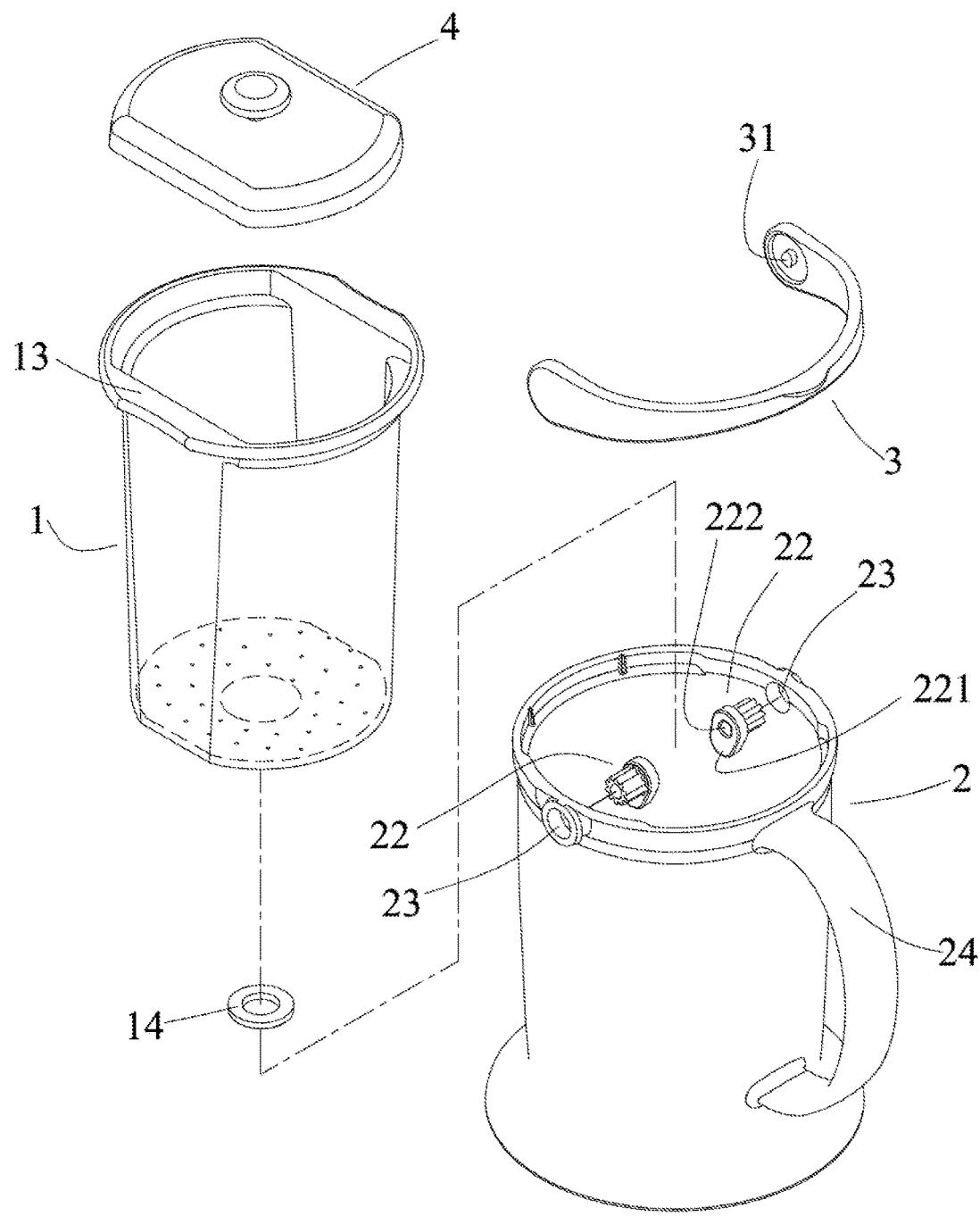
FIG. 1 is an explosive view of an embodiment according to the present invention.
Figure 2:
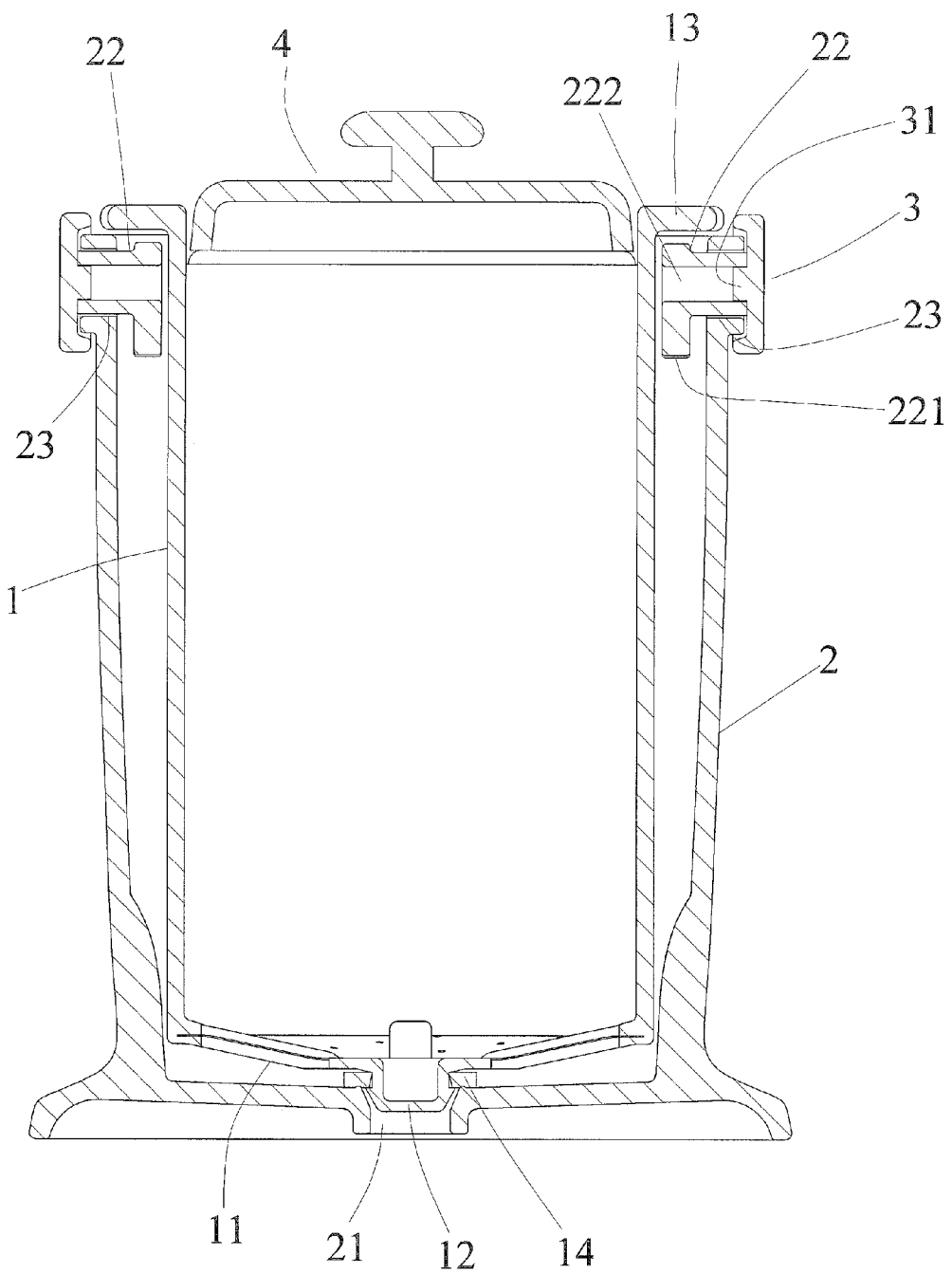
FIG. 2 is a longitudinal sectional view of an embodiment according to the present invention.
Figure 3:
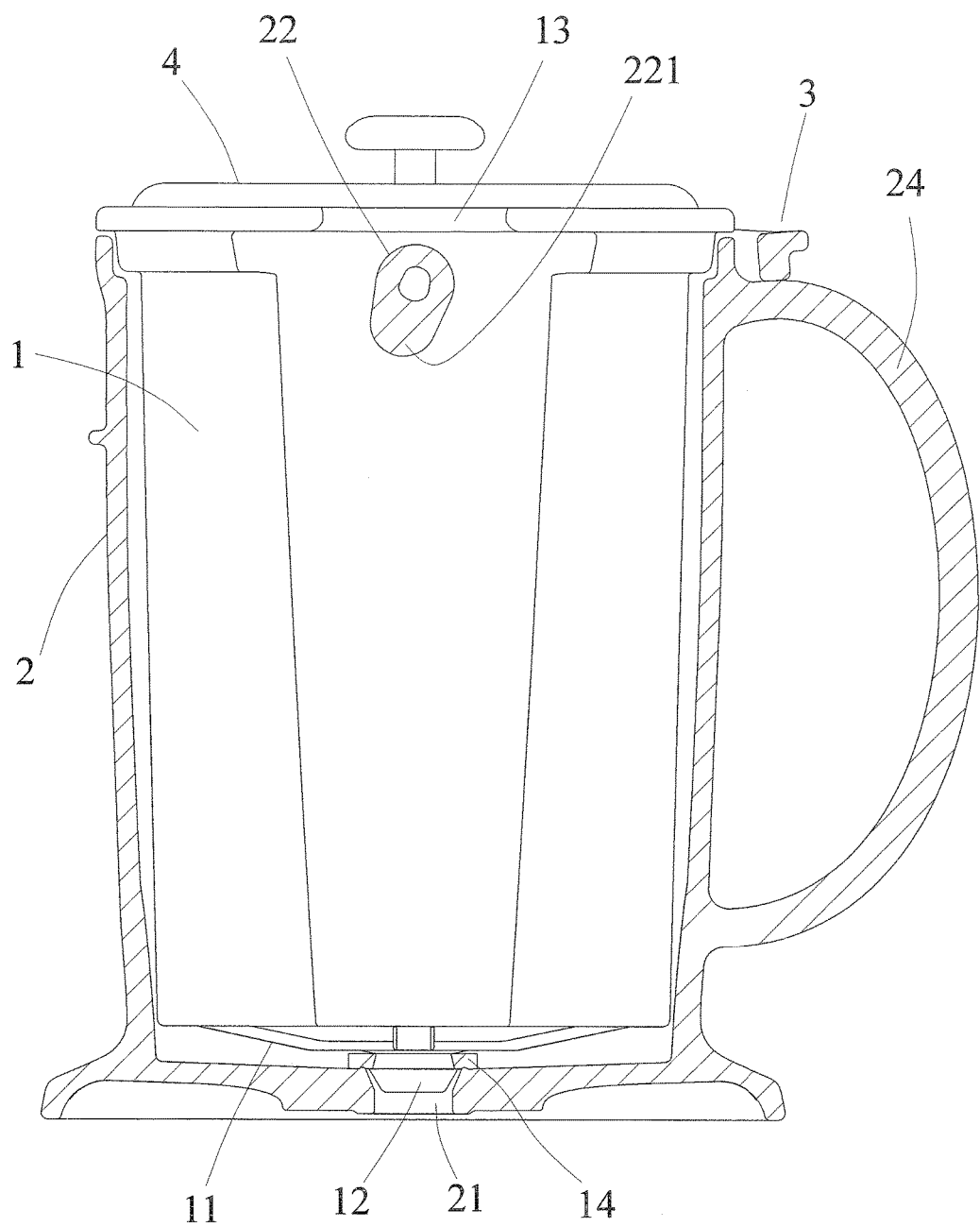
FIG. 3 is another longitudinal sectional view of an embodiment according to the present invention.

Refer to FIG. 1, FIG. 2 and FIG. 3, a filter cup of the present invention mainly includes an inner cup 1, an outer cup 2 and a grip 3.

A bottom side of the inner cup 1 is a conical surface used as a filter bottom surface 11. A plug-like member 12 is set on the filter bottom surface 11. At least two flanges 13 are formed on two corresponding edges of the top of the inner cup 1. In a preferred embodiment of the present invention, the filter bottom surface 11 is a filter screen. The inner cup 1 further includes a sealing gasket 14 arranged around the plug-like member 12.

The inner cup 1 is mounted in the outer cup 2. A discharge hole 21 is disposed on the bottom surface of the outer cup 2 and is corresponding to the plug-like member 12 of the inner cup 1. The plug-like member 12 is plugged into and closely matched with the discharge hole 21 to prevent liquid in the inner cup 1 from leaking out. Two rotating members 22 are pivotally connected to an upper part of the outer cup 2 and arranged correspondingly to each other. A leaning portion 221 is radially extended and projecting from a part of an edge at one end of each rotating member 22 that is close to an inner wall of the outer cup 2. The positions of the two rotating members 22 are corresponding to the positions of the two flanges 13 of the inner cup 1.

Two ends of the grip 3 are connected to and positioned by the two rotating members 22 respectively.

Figure 4:
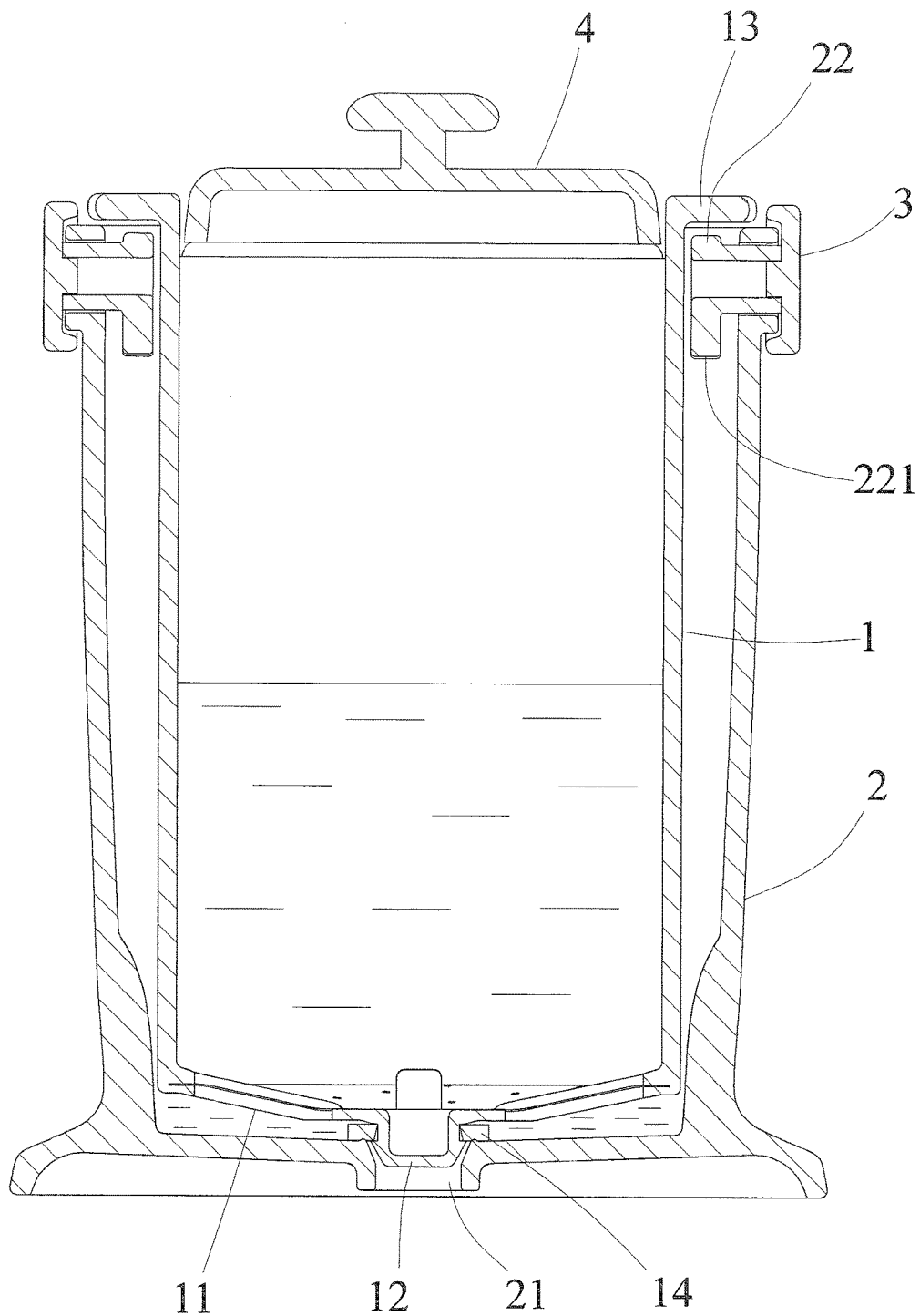
FIG. 4 is a longitudinal sectional view of an embodiment in which an inner cup and an outer cup are closely connected to prevent leakage according to the present invention.
Figure 5:
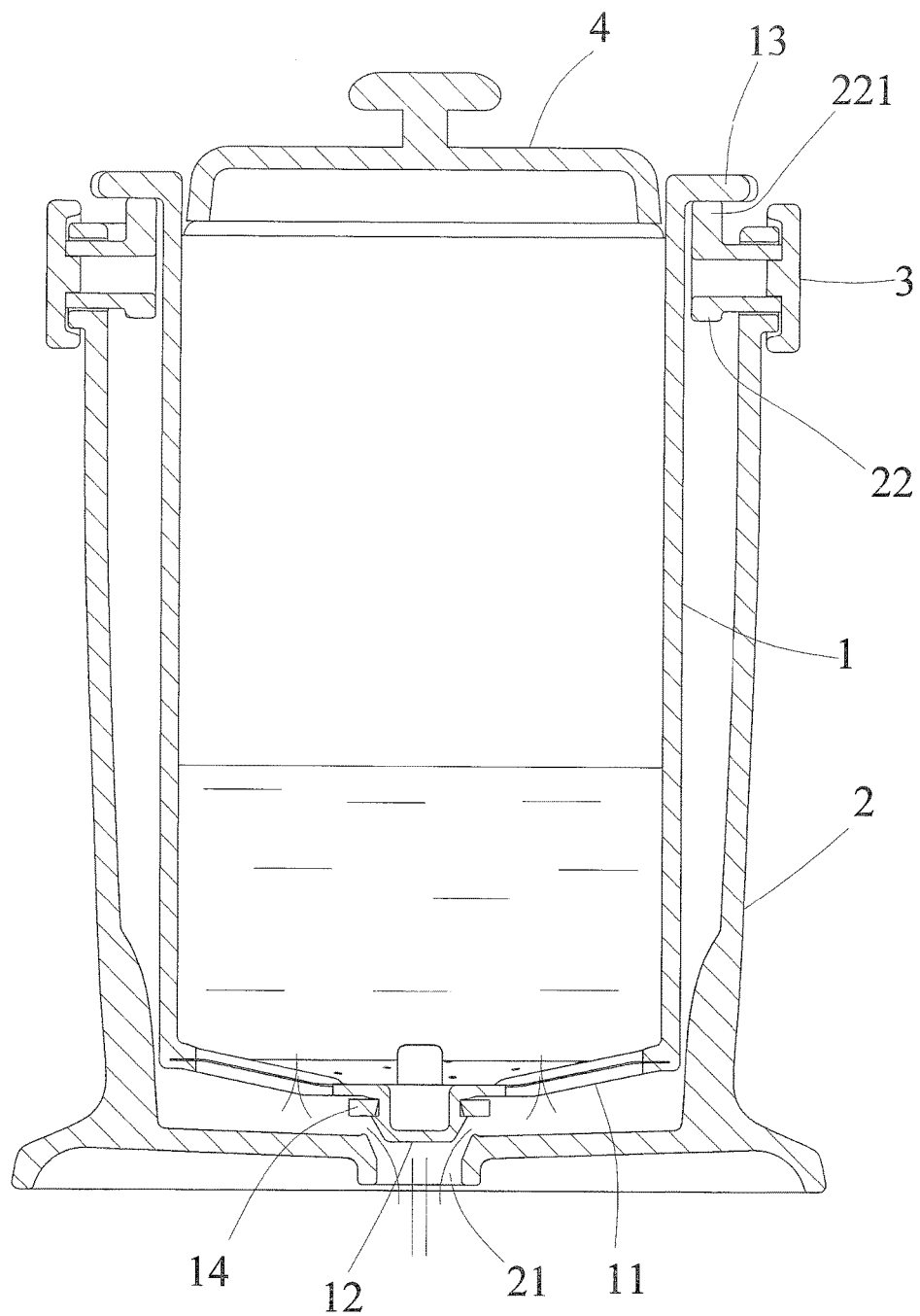
FIG. 5 is a longitudinal sectional view of an embodiment in which a gap is formed between an inner cup and an outer cup according to the present invention.
Figure 6:
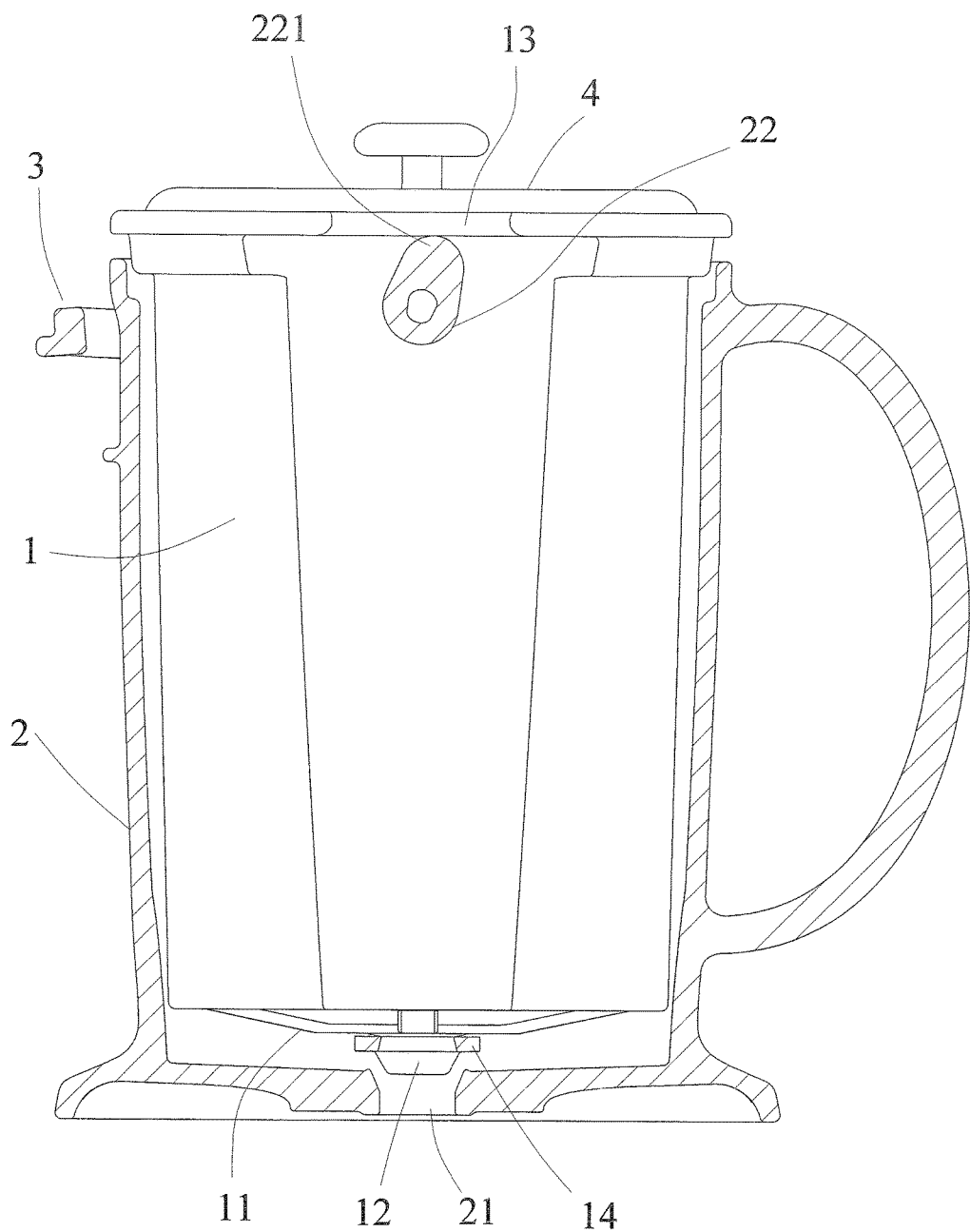
FIG. 6 is another longitudinal sectional view of an embodiment in which a gap is formed between an inner cup and an outer cup according to the present invention.

Refer to FIG. 4, FIG. 5 and FIG. 6, the leaning portions 221 are gradually rotated toward the flanges 13 of the inner cup 1 along with the rotation of the rotating members 22 being driven by the grip 3 when a user pours some tea into the inner cup 1 for making tea and pulls the grip 3. Then the leaning portions 221 reach and lean against the flanges 13 of the inner cup 1. Thus the inner cup 1 is pushed to move upward and a gap is formed between the plug-like member 12 and the discharge hole 21. The tea infusion inside the inner cup 1 flows out through the gap and the discharge hole 21 for users to drink.

In an embodiment of the present invention, each rotating member 22 includes an axial hole 222 while a projecting pin 31 is arranged at each of two ends of the grip 3. The projecting pin 31 is mounted into and fixed in the axial hole 222 correspondingly. Thus the rotating members 22 are driven to rotate by the grip 3 being pulled. Moreover, in a preferred embodiment, an upper part of the outer cup 2 is disposed with two insertion holes 23 corresponding to each other and used for receiving the two rotating members 22 respectively.

In an embodiment of the present invention, the filter cup further includes an inner cup cover 4 set over the inner cup 1.

In an embodiment of the present invention, the filter cup further includes a handle 24 connected to an outer wall of the outer cup 2.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A filter cup comprising:
an inner cup having a top, a filter bottom surface, and an intermediate portion extending therebetween, the filter bottom surface defining a conical surface contour, a plug-like member extending from the filter bottom surface, and at least two flanges set on two corresponding edges at the top of the inner cup;
an outer cup receiving the inner cup therein and having an upper part, a bottom surface, and a side wall portion extending therebetween, a discharge hole formed in the bottom surface aligned with the plug-like member of the inner cup for being plugged by the plug-like member to prevent leakage and
two rotating members pivotally connected to the upper part of the outer cup and disposed respectively underneath the two flanges of the inner cup received in the outer cup; a leaning portion radially extended and projecting from an axial part of each rotating member adjacent the side wall portion of the outer cup; and
a grip having two ends connected to the two rotating members respectively;
wherein the rotating members are driven to move the leaning portions thereof to push the flanges of the inner cup upward when the grip is displaced relative to the outer cup; a gap being thereby formed between the plug-like member and the discharge hole; allowing liquid in the inner cup to flow out from the discharge hole through the gap.

2. The filter cup as claimed in claim 1, wherein the filter bottom surface forms a filter screen.

3. The filter cup as claimed in claim 2, wherein a sealing gasket is disposed around the plug-like member for enhancing leakage prevention between the plug-like member and the discharge hole.

4. The filter cup as claimed in claim 3, wherein an inner cup cover is set over the inner cup.

5. The filter cup as claimed in claim 2, wherein the upper part of the outer cup is formed with two insertion holes; the two insertion holes are opposed to each other and pivotally engaged by the two rotating members respectively.

6. The filter cup as claimed in claim 3, wherein each rotating member includes an axial hole, and a projecting pin is formed at each of two ends of the grip; the projecting pin fixedly engaging the axial hole corresponding thereto, whereby the rotating members are driven to rotate by the grip being pulled.

7. The filter cup as claimed in claim 6, wherein a handle is connected to an outer wall of the outer cup.

8. The filter cup as claimed in claim 2, wherein each rotating member includes an axial hole, and a projecting pin is formed at each of two ends of the grip; the projecting pin fixedly engaging the axial hole corresponding thereto, whereby rotating members are driven to rotate by the grip being pulled.

9. The filter cup as claimed in claim 8, wherein a handle is connected to an outer wall of the outer cup.

* * * * *